Jan. 13, 1970  F. KUHLMANN  3,489,250
BRAKING DEVICE PARTICULARLY FOR CARRIAGE-TYPE
DRAFTING MACHINES
Filed Nov. 12, 1968  2 Sheets-Sheet 1

Inventor:
Franz Kuhlmann

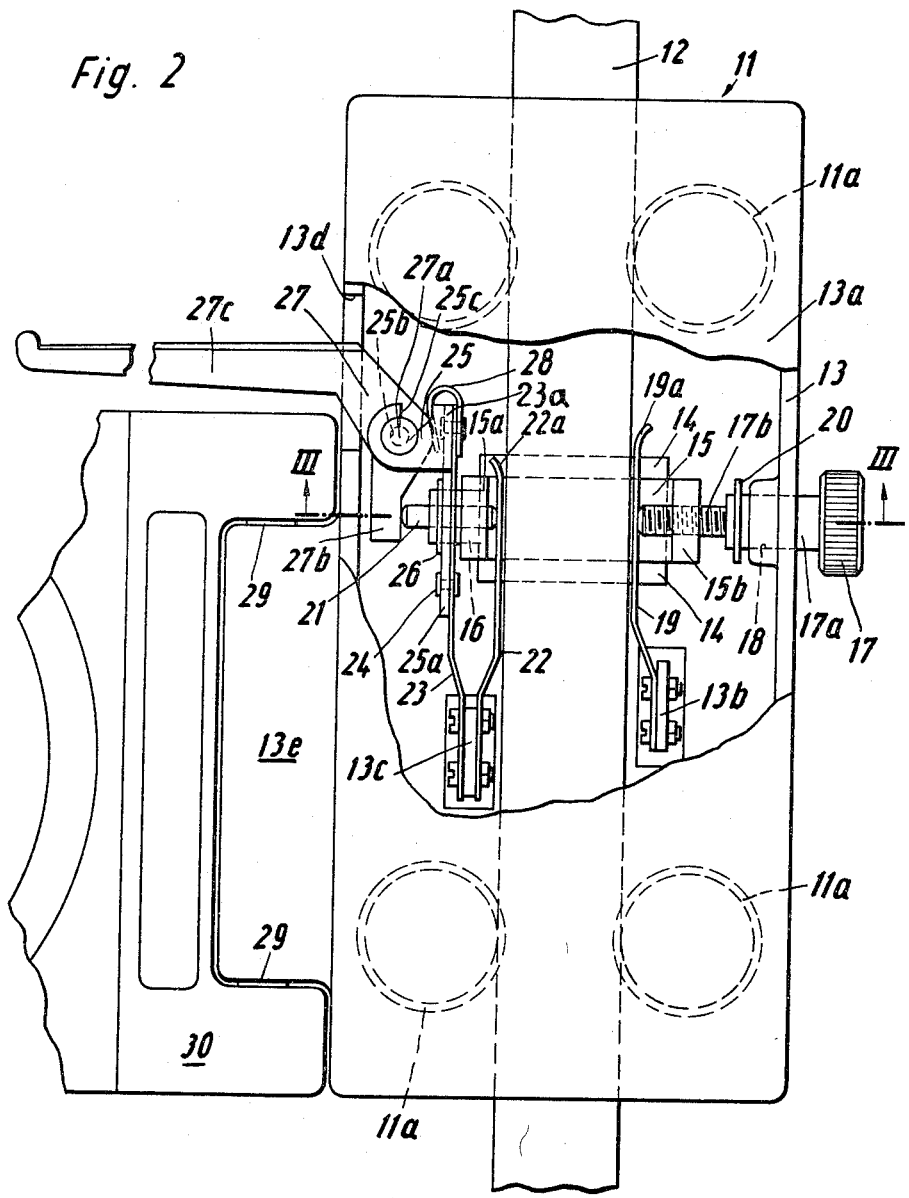

United States Patent Office 3,489,250
Patented Jan. 13, 1970

3,489,250
BRAKING DEVICE PARTICULARLY FOR CARRIAGE-TYPE DRAFTING MACHINES
Franz Kuhlmann, Wilhelmshaven, Germany, assignor to Franz Kuhlmann KG, Wilhelmshaven, Germany, a corporation of Germany
Filed Nov. 12, 1968, Ser. No. 774,951
Int. Cl. B61h 7/12; F16d 63/00
U.S. Cl. 188—42                                5 Claims

ABSTRACT OF THE DISCLOSURE

A braking device contained in a carriage movable on a trackway, said device includes a yoke surrounding said trackway and slidable normal to the longitudinal axis thereof, two oppositely moving braking elements secured to said yoke and associated with opposed parallel faces of said trackway; one element is movable by a mechanism effecting a permanent braking action, while the other element is movable by a mechanism effecting a temporary braking action. Upon actuation of either braking elements by one of said mechanisms said yoke is displaced by reaction forces and thus the other braking element carried thereby is also displaced towards the trackway.

Background of the invention

This invention relates to a braking device contained in a carriage which slides, usually by means of rollers, on a trackway disposed parallel with an edge of a drafting board.

The braking device to which the invention is directed comprises braking elements, such as braking bolts, adapted to move normal to the longitudinal axis of the trackway and, upon actuation of the brake, frictionally engage, against a resetting force, opposed edge faces of the trackway. For this purpose there is provided a U-shaped yoke partially surrounding the trackway and adapted to be displaced normal to the length dimension thereof. The yoke has two legs each extending over opposed edges of the trackway. One leg fixedly carries a brake shoe while in the other leg there is disposed a braking bolt slidable in the direction of the possible yoke movement and urged against one edge face of the trackway upon actuation. Simultaneously, the braking force slightly displaces the yoke, whereby the brake shoe or braking bolt secured to the other leg of the yoke frictionally engages the opposite edge face of the trackway. Due to the alignment of the two braking bolts in the yoke, their frictional engagement with opposed edge faces of the trackway occurs along a common straight line and in two planes spaced from one another and normal to said line. Between the slidable braking bolt and the edge face of the trackway there is disposed a leaf spring which, in a released condition of the brake, lifts the braking bolt off the trackway. A braking mechanism of the afore-discussed type is disclosed in U.S. application by Kuhlmann et al., Ser. No. 686,041, filed Nov. 28, 1967, now Patent No. 3,410,370, entitled "Braking Device for Carriage-Type Drafting Machines."

A brake mechanism of the type outlined has, among others, an important advantage in that the possibility of deformation or tilting of the carriage with respect to the trackway experienced in earlier types of braking devices is excluded.

In order to effect a continuous braking action, however, the operator has to apply a continuous manual force which, in certain types of drafting problems, for example, when a plurality of parallel lines have to be drawn, might be very inconvenient.

Objects and summary of the invention

In view of the aforenoted disadvantage it is an object of the invention to provide an improved braking device of the above-outlined type which, while maintaining its above discussed advantages, may be locked in its actuated condition so that manual force has to be exerted only momentarily to effect a braking operation continuing until a manual release force is applied.

It is a further object of the invention to provide an improved braking mechanism of the type outlined hereinabove which, depending upon requirements, may effect either a continuous braking initiated by a momentary manual force or a braking action that lasts only as long as the externally applied manual force.

Briefly stated, according to the invention, there is provided a braking mechanism generally of the type disclosed in the aforenoted U.S. application including a braking bolt threadedly held in the yoke and integral with a manually operable knurled head. Between the end of said braking bolt and an edge face of the trackway there extends a leaf spring which, upon rotation of the knurled screw or braking bolt, is urged thereby into frictional engagement with said edge face. At the same time, another braking element adjacent the opposed, parallel edge face of the trackway and carried by the yoke is drawn thereagainst as the yoke is slightly displaced by the brake reaction forces.

In a modification the braking element opposite the knurled screw or braking bolt may be displaced towards the trackway by means of a manually engageable braking lever. Thus, if this lever rather than said knurled screw is manipulated, a braking action is effected that lasts only as long as the manual force on the braking lever is applied.

The invention will be better understood and further objects as well as advantages will become more apparent from the ensuing detailed specification of two exemplary embodiments taken in conjunction with the drawings.

Brief description of the drawings

FIG. 2 is an elevational view of a second embodiment according to the invention with the carriage housing partially broken away for clarity.

Description of a first embodiment

Figure 1:
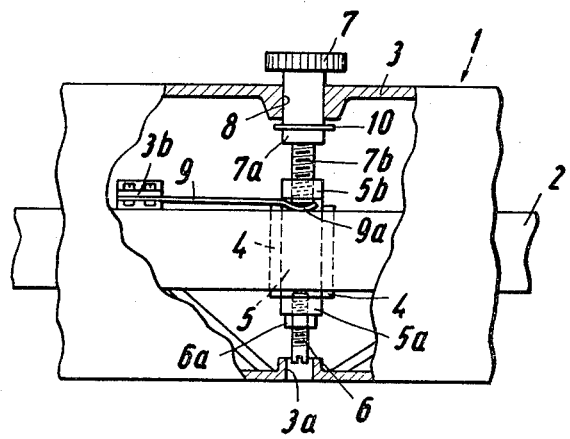
FIG. 1 is an elevational view of a first embodiment according to the invention with the carriage housing partially broken away for clarity.

Turning now to FIG. 1, there is shown a carriage generally indicated at 1 which is guided by means of rollers (not shown) on a trackway 2. To the housing 3 of the carriage 1 there are secured, normal to the longitudinal axis of trackway 2, guide strips 4 between which there is slidably held a U-shaped yoke 5 surrounding the trackway 2 with a clearance and in a cradle-like manner. The parallel legs of the U-shaped yoke 5 are given reference numerals 5a (lower leg) and 5b (upper leg). The lower leg 5a is provided with an opening that threadedly holds a first braking element, which is an adjustable braking bolt 6 carrying a securing nut 6a. Bolt 6 has a free slotted end accessible through opening 3a of housing 3.

The housing 3 is provided with a cylindrical bore 8 through which extends a second braking element which is a knurled screw 7 having a shaft 7a slidably held in bore 8. The screw 7 is in alignment with the space between the guide strips 4. The knurled screw 7 continues downwardly in a threaded portion 7b engaged in a threaded opening provided in the upper leg 5b of the yoke 5. The threaded portion 7b is held in the threaded opening or bore of leg 5b in such a manner that the lower free end of the threaded portion 7b is in engagement with the curved free end 9a of a leaf spring 9 held in a shackle 3b secured to housing 3. As seen in FIG. 1, the free end of the threaded portion 7b of knurled screw 7 is adapted to urge the free end 9a of leaf spring 9 into frictional contact with the upper edge of trackway 2. The knurled screw 7 is held captive in bore 8 by virtue of snap ring 10 provided on shaft 7a inside the housing 3.

Description of a second embodiment

Figure 3:
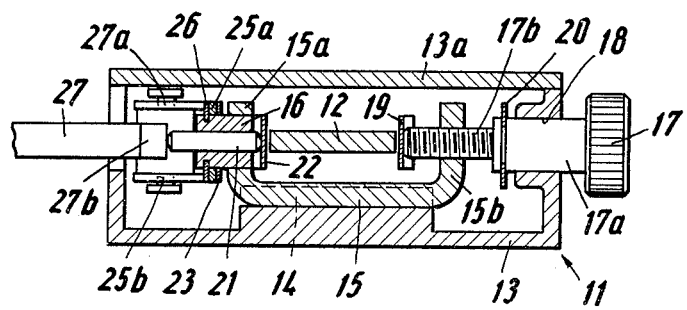
FIG. 3 is a sectional view taken along line III—III of FIG. 2.

Turning now to FIGS. 2 and 3, there is illustrated a carriage generally indicated at 11, having wheels or rollers 11a engaging a trackway 12 held in a vertical guiding frame (not shown).

To the housing 13 provided with a cover plate 13a, there are secured, normal to the longitudinal axis of trackway 12, guide strips 14 between which there is slidably held a U-shaped yoke 15 surrounding the trackway 12 with a clearance and in a cradle-like manner. The parallel legs of the U-shaped yoke 15 are given reference numerals 15a (left leg) and 15b (right leg). The leg 15a is provided with an opening into which fits a guide socket 16.

The housing 13 is provided with a cylindrical bore 18 through which extends a knurled screw 17 having a shaft 17a slidably held in bore 18. The knurled screw 17 is in alignment with the space between the guide strips 14. The knurled screw 17 continues in a threaded portion 17b threadedly held in a bore of leg 15b of yoke 15 in such a manner that the free end of the threaded portion 17b is, with its frontal face, in engagement with one face of a leaf spring 19. The free end 19a of spring 19 is at its other end fixedly held by a shackle 13b secured to the housing 13. Thus, it is seen from FIG. 2 that the free end of threaded portion 17b of knurled screw 17 is adapted to urge leaf spring 19 into frictional contact with the right edge face of trackway 12. A large portion of the leaf spring 19 is disposed substantially parallel to trackway 12 between the latter and the terminus of the threaded portion 18b of the knurled screw 17. The knurled screw 17 is held captive in the bore 18 by means of a snap ring 20 secured to the shaft 17a inside the housing 13.

In the guide socket 16 there is slidably held a braking bolt 21 adapted to be linearly displaced parallel to the path of movement of yoke 15.

To housing 13 there is secured a shackle 13c to which there are affixed two spaced leaf springs 22 and 23 extending substantially parallel to the longitudinal axis of trackway 12. The leaf spring 22, having end portion 22a, is disposed between one edge face of trackway 12 and leg 15a and is engaged on its face remote from trackway 12, by the end of braking bolt 21.

To the end portion of leaf spring 23 remote from shackle 13c there is secured, by means of a rivet 24, the extended base plate 25a of a forked bearing block 25. In approximately the middle of the leaf spring 23 and the base plate 25a lying flat thereagainst, there is provided an opening through which extends the guide socket 16. By means of a snap ring 26 attached to the guide socket 16, the leaf spring 23 is, together with the base plate 25a, secured to the leg 15a of yoke 15 in a form-locking manner and with a small play shown in an exaggerated extent in FIGS. 2 and 3. The said play provides a stress-free compensation for the slight change in the angular position of the leaf spring 23 with respect to the sliding axis of yoke 15 with the guide socket 16 during the flexing of leaf spring 23 about shackle 13c. For the same purpose, the leaf spring 23 and the base plate 25a may be slightly curved or kinked towards the leg 15a at the location of its form-locking connection therewith. The bearing block 25 proper is disposed immediately adjacent the end 23a of the leaf spring 23. The forked bearing block 25 has two axially aligned bearing bores 25b that are normal to the longitudinal axis of braking bolt 21 and trackway 12. The forked portion of bearing block 25 receives a bell-crank type braking lever 27 which is held in bores 25b by means of bearing pins 27a. The shorter, actuating arm 27b of the lever 27 engages the braking bolt 21, while its longer arm 27c serves as a manually engageable member which extends outwardly from the housing 13 through an aperture 13d provided therein.

The bearing bores 25b are, at their load-free side, open by virtue of radial slots 25c which permit a removal of the braking lever 27 from bearing block 25. In its inserted position, the braking lever 27 is biased by a locking spring 28 secured to the bearing block 25.

To housing 13 there is affixed a shank 13e which holds, by virtue of a pin 29, a pivotal member 30 adapted to receive the drawing head (not shown) of the drafting machine.

Operation of the first embodiment

The braking device shown in FIG. 1 is a simple embodiment adapted to effect a continuous braking action initiated by a momentary application of external manual force.

This device is actuated by manipulating the knurled head of screw 7. As a result, the free end 9a of leaf spring 9 is urgd into frictional engagement with the upper edge of trackway 2 by the terminus of threaded portion 7b. Simultaneously, the reaction forces displace the yoke 5 upwardly, and as a result, the terminus of braking bolt 6 carried by leg 5a of yoke 5, frictionally engages the lower edge face of trackway 2. By virtue of the free play of both the knurled screw 7 and the yoke 5 in the direction of braking, both forces effectuating the frictional engagement are fully balanced so that a deformation between the carriage 1 or the brake and the trackway 2 cannot take place.

If now the brake is released by appropriately turning the knurled head of screw 7, the leaf spring 9, by virtue of its own resiliency, slightly rises and clears the upper edge face of trackway 2. At the same time, by virtue of the withdrawal of screw 7, the yoke 5 slightly drops until the leg 5b comes to a rest on the end 9a of leaf spring 9 that also has returned into its position of rest. By virtue of the slight downward displacement of yoke 5 in the guiding strips 4, the braking bolt 6 is retracted from the lower edge face of the trackway 2. The brake play may be set by adjusting the braking bolt 6 through opening 3a.

Operation of the second embodiment

The braking device shown in FIGS. 2 and 3 is an embodiment adapted to effect, depending upon requirements, both a continuous braking action initiated by a momentary application of manual force and a braking action that lasts only as long as an external manual force is applied.

At the outset it is to be noted that the weight of the carriage 11 and all parts disposed therein or thereon, as well as the drawing head, are, in a known manner, counter-balanced by a weight (not shown) attached to the carriage 11 by means of a cable (also not shown). Thus, the carriage 11 may be freely displaceable on the vertical trackway 12 when the brake is in its released position as shown in FIGS. 2 and 3.

In order to effect a continuous braking action initiated by momentarily applied manual force, the knurled screw 17 is turned, whereby the terminus of the threaded portion 17b urges the leaf spring 19 into a frictional contact with one edge face of the trackway 12. Thereby the leaf spring 23 is, by virtue of its form-locking connection with leg 15a, slightly flexed from its position of rest in the direction of trackway 12. When the brake is released from the permanent braking action by appropriately turning the knurled head of screw 17, the leaf springs 19 and 22 are brought out of frictional contact with the edge faces of trackway 12 due to their own resiliency and also by virtue of the resetting force of leaf spring 23.

In order to achieve a momentary braking action, that is, a braking action that lasts only as long as an external (manual) force is exerted, the operating lever 27c of the braking lever 27 is depressed, whereby the arm 27b bears on the braking bolt 21 in the direction of trackway 12 and, as a result, the braking bolt 21 urges leaf spring 22 into frictional contact with the left edge face of trackway 12. At the same time, the reaction forces move the bearing block 25 away from trackway 12 in an arcuate path about the point of contact between the arm 27b and the braking bolt 21. Due to the form-locking engagement of the leaf spring 23 and base plate 25a with the yoke 15, the flange 15b thereof is drawn towards the trackway 12 so that the terminus of the threaded portion 17b of knurled screw 17 urges the spring 19 into frictional contact with the right edge face of the trackway 12. Here also, there is an even distribution of the braking force applied to the trackway 12 in a pincer-like manner.

When the manual force exerted on the arm 27c is removed, all parts return to their initial position by virtue of the resetting force of leaf springs 19, 22 and 23. The desired braking play for this operation may be set by adjusting the knurled screw 17.

If the operating lever 27c interferes with the draftsman's work, or, if the carriage 11 is to be packaged either for storage or shipment, the braking lever 27 may be separated from the bearing block 25 by lifting bearing pins 27a out of bearing bores 25b through slots 25c against the force of the locking spring 28 and then removing the entire lever 27 through opening 13d.

That which is claimed is:

1. A braking device contained in a carriage adapted to move along a trackway, said device is of the type including a U-shaped yoke surrounding said trackway and slidably held in a carriage housing in a direction normal to the longitudinal axis of said trackway, said yoke having two parallel legs, one leg carrying a first braking element, the other leg carrying a second braking element slidable relative to said other leg in a direction normal to said axis, a leaf spring disposed between said second braking element and said trackway, brake actuating means to cause said second braking element to move with respect to said yoke in the direction of said trackway against the force of said leaf spring and simultaneously causing said yoke to be displaced in the opposite direction whereby said first braking element is moved towards said trackway, said first and second braking elements adapted to impart frictional braking pressures to opposed parallel faces of said trackway, the improvement comprising a braking bolt or screw extending through said housing and constituting said second braking element and having (A) a manually operable head disposed externally of said housing,
(B) a shank portion extending from said head and passing through an opening in said housing, and
(C) a threaded portion extending from said shank portion and held in a complementally threaded bore of one of said legs, said threaded portion having a terminus adapted, when said head is rotated, to urge said leaf spring into frictional engagement with one face of said trackway.

2. A braking device as defined in claim 1 including two parallel spaced guiding strips secured to said housing, said yoke is slidably held between said strips; the longitudinal axis of said braking bolt constituting said second braking element coincides with a center line of the space between said strips.

3. A braking device as defined in claim 1, wherein said first braking element is constituted by a braking bolt linearly slidably held in a leg of said yoke remote from the leg threadedly holding said first braking element, said braking device further includes (A) a further leaf spring fixedly held in said housing and extending between said trackway and said first braking element,
(B) a bearing block,
(C) a bell-crank type braking lever pivotally secured to said bearing block and formed of
 (1) a manually operable arm extending outwardly from said housing and
 (2) an actuating arm adapted to move said braking bolt constituting said first braking element with respect to said yoke towards said trackway and urge said further leaf spring into frictional contact with one face of said trackway when said manually operable arm is manipulated, and
(D) a third leaf spring fixedly held in said housing and carrying said bearing block and said yoke.

4. A braking device as defined in claim 3, wherein said third leaf spring has a first end fixedly held in said housing and a second end carrying said bearing block; said yoke is attached to said third leaf spring intermediate the two said ends thereof.

5. A braking device as defined in claim 3, wherein said braking lever is adapted to be readily lifted off said bearing block and removed from said carriage.

References Cited

UNITED STATES PATENTS 3,410,370 11/1968 Kuhlmann et al. _____ 188—42
3,417,843 12/1968 Trollope _____ 188—73 X GEORGE E. A. HALVOSA, Primary Examiner U.S. Cl. X.R.

188—43, 83